US005603217A

United States Patent [19]

Majersik et al.

[11] Patent Number: 5,603,217

[45] Date of Patent: Feb. 18, 1997

[54] COMPLIANT MASTER CYLINDER

[75] Inventors: Loren E. Majersik, Oakwood; Abraham S. Farag, Dayton, both of Ohio

[73] Assignee: General Motors Corporation, Detroit, Mich.

[21] Appl. No.: 615,656

[22] Filed: Mar. 13, 1996

[51] Int. Cl.$^{6}$ .................................................... B60T 11/20

[52] U.S. Cl. ................................ 60/562; 60/585; 60/589

[58] Field of Search ............................ 60/562, 574, 585, 60/588, 589

[56] References Cited

U.S. PATENT DOCUMENTS

| | | | |
|---|---|---|---|
| 2,941,368 | 6/1960 | Porter | 60/574 |
| 4,709,550 | 12/1987 | Sauveg et al. | 60/562 |
| 4,876,853 | 10/1989 | Shirai et al. | 60/562 X |
| 4,939,901 | 7/1990 | Saalbach et al. | 60/562 |
| 5,005,350 | 4/1991 | Reinartz et al. | 60/589 X |
| 5,018,353 | 5/1991 | Pugh | 60/589 X |
| 5,070,698 | 12/1991 | Savidan | 60/562 |
| 5,246,283 | 9/1993 | Shaw et al. | 303/115.2 |
| 5,414,998 | 5/1995 | Manzo et al. | 60/562 |

*Primary Examiner*—Hoang Nguyen
*Attorney, Agent, or Firm*—Jeffrey A. Sedlar

[57] ABSTRACT

A compliant master cylinder includes a primary piston and a secondary piston which are movable to provide fluid pressure to effect wheel braking in a vehicle. In addition, the master cylinder includes a compliant assembly which supplies conventional pedal feel and travel characteristics when the primary and secondary pistons are substantially immovable due to isolation the master cylinder from the wheel brakes. The compliant assembly includes a push rod piston that is movable against a selected amount of fluid pressure and spring force while the primary piston remains stationary. The fluid force is supplied by controlling the flow of fluid from behind the push rod piston through a flow restrictive orifice to a conventional fluid reservoir on the master cylinder assembly. The compliant master cylinder assembly is operable to provide fluid braking pressure through movement of the primary and secondary pistons by mechanical contact between the primary piston and the push rod piston after a sufficient amount of actuation.

7 Claims, 2 Drawing Sheets

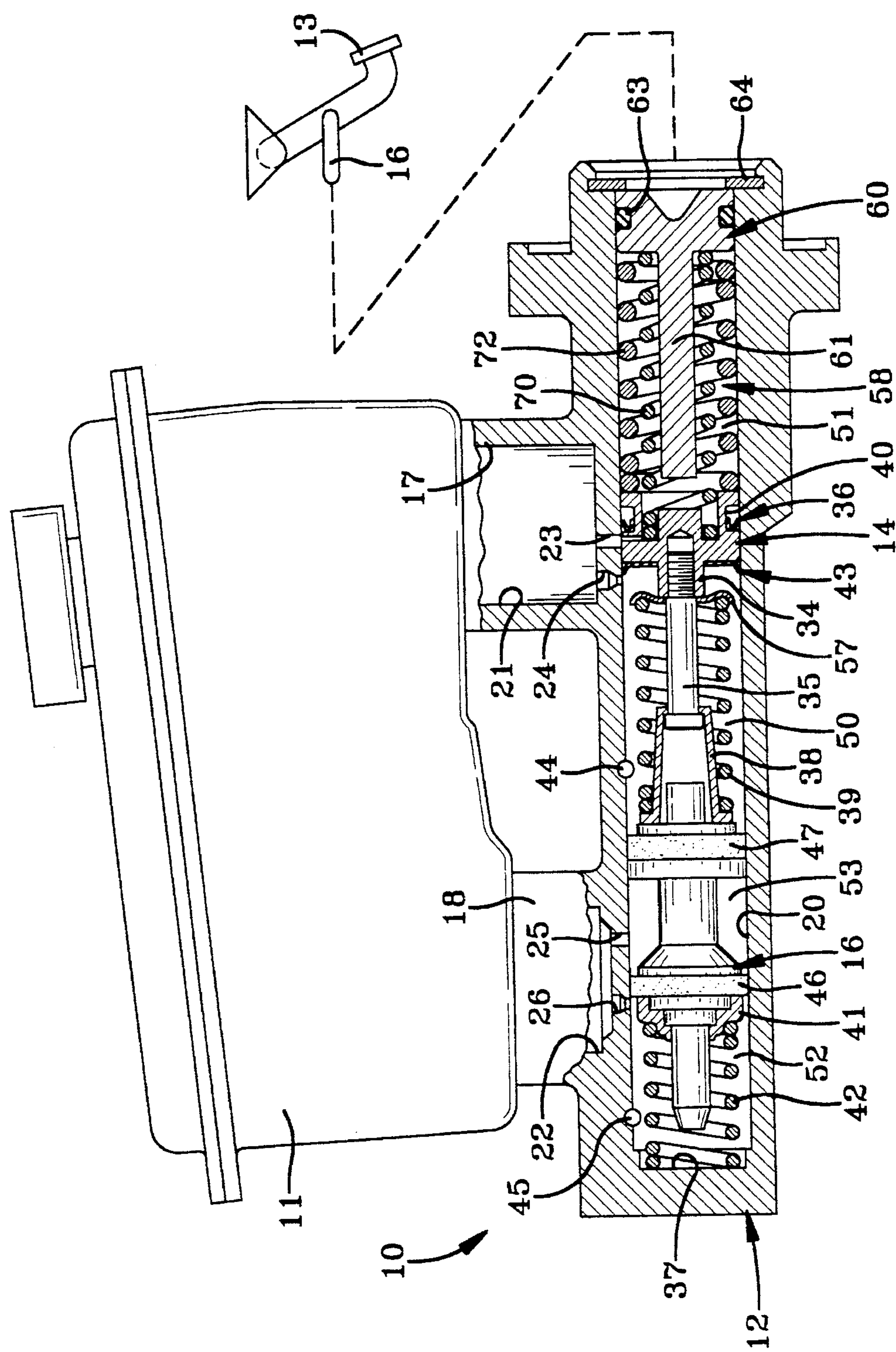
FIG—1

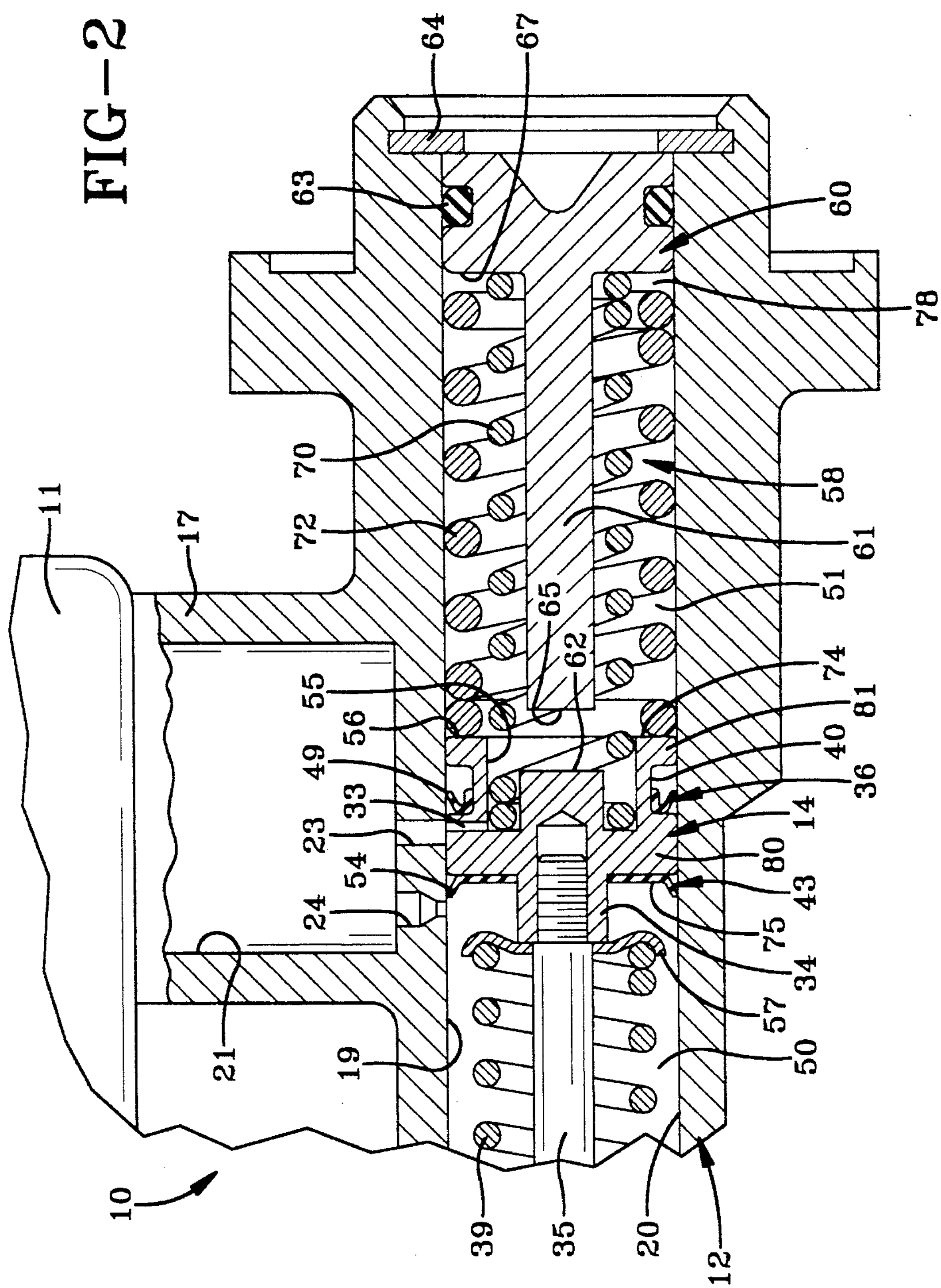
FIG—2
64
67
63
60
78
70
58
11
17
72
61
51
65
62
74
55
56
81
40
49
36
33
14
23
80
54
43
24
75
34
57
21
19
50
10
39
35
20
12

COMPLIANT MASTER CYLINDER

BACKGROUND OF THE INVENTION

The present invention relates to a master cylinder for a vehicle braking system and more particularly, to a compliant master cylinder for use with a braking system that does not have the typical inherent compliance associated with brake apply operation.

With a brake by wire vehicle braking system wherein the application of fluid brake pressure to the wheel brakes is controlled by an electric or an electro-hydraulic means rather than by the manual application of force to the master cylinder, the master cylinder is typically isolated from the rest of the braking system during brake operation. This changes the response characteristics at the vehicle's brake pedal from those conventionally provided and prevents the driver from experiencing the customary brake pedal travel and feel.

It is preferable that the vehicle driver experience a more conventional pedal response when applying a vehicle's brakes on a vehicle with electric or electro-hydraulic brake control. Accordingly, brake by wire systems include ancillary components to approximate conventional pedal characteristics during brake application. These ancillary components increase costs and require additional space.

SUMMARY OF THE INVENTION

The present invention provides a compliant master cylinder that supplies the typical brake pedal travel and feel characteristics to a brake system when the master cylinder is isolated from the wheel brakes. This is accomplished by providing a compliant assembly between the primary piston of the master cylinder and the brake pedal push rod. The compliant assembly includes a push rod piston that is movable against spring and fluid forces upon the application of manual pressure to the brake pedal even when the primary piston is substantially immovable due to isolation of the master cylinder from the remainder of the braking system.

The compliant master cylinder preferably includes a body having a longitudinal bore and a transverse bore. A fluid reservoir is carried on the body and communicates with the transverse bore. A compensation port extends through the body between the transverse bore and the longitudinal bore providing a means of communicating fluid between the master cylinder and the reservoir.

A primary piston is slidably carried in the longitudinal bore of the master cylinder. The primary piston separates the longitudinal bore into a high pressure chamber that communicates with the brake system and a compliant chamber. A flow restrictive orifice is provided between the compliant chamber and the reservoir.

A push rod piston is slidably carried in the longitudinal bore on the compliant chamber side of the primary piston. The pushrod piston preferably has a post extending toward the primary piston. The push rod piston is movable between an at-rest position and a range of apply positions while the primary piston remains substantially unmoved.

At least one spring extends between the primary piston and the push rod piston. The compensation port of the transverse bore communicates with the longitudinal bore on the pushrod piston side of the primary piston through the flow restrictive orifice. When the push rod piston is moved from the at-rest position, fluid in the compliant chamber of the longitudinal bore between the primary piston and the push rod piston is forced through the compensation port and the flow restrictive orifice to the reservoir.

In operation, when force is applied to the braking pedal of a vehicle incorporating the present invention and the master cylinder is isolated from the remainder of the hydraulic braking system, the push rod applies the pedal force to the push rod piston in the master cylinder which is movable against the spring and fluid forces providing the customary brake pedal travel and feel. This occurs while the primary piston remains substantially immovable due to the non-compressibility of the braking fluid.

According to a preferred embodiment of the present invention, the spring force is provided by a combination of an inner spring and a stronger outer spring. The inner spring resists movement of the push rod piston upon the initial application of pedal force. The outer spring initially provides no force against movement of the push rod piston. When a selected amount of movement has occurred, the push rod piston operates against the force of both the outer and the inner springs during further travel of the brake pedal.

Additional resistance to movement of the push rod piston is provided by fluid force created by the flow restrictive orifice. The flow restrictive orifice meters the flow of fluid out from the compliant chamber between the push rod piston and the primary piston. The fluid flows from the compliant chamber into the reservoir of the master cylinder assembly. The amount of restriction provided by the orifice is designed according to the application and the selected pedal travel and feel characteristics desired for the system.

The push rod piston is designed so that after a selected amount of travel it contacts the primary piston ensuring that the master cylinder can be utilized to provide a pressure source for braking application in a conventional manner when desired or needed. In such operation the master cylinder's pistons can be manually moved to pressurize the braking system.

BRIEF DESCRIPTION OF THE DRAWINGS

FIG. 1 is a fragmentary cross sectional view of a master cylinder.

FIG. 2 is a fragmentary cross sectional detail illustration of a portion of a master cylinder illustrated in FIG. 1.

DETAILED DESCRIPTION OF THE PRESENTLY PREFERRED EMBODIMENT

Referring to the drawings, illustrated in FIG. 1 is a master cylinder assembly designated in the aggregate as 10. The master cylinder assembly 10 includes a master cylinder body 12 formed of an acceptably rigid material such as metal or plastic and an associating fluid reservoir 11. The master cylinder assembly 10 is responsive to the manual application of force to brake pedal 13 through the push rod 16.

A longitudinal bore 20 extends through body 12 and slidably carries a tandem piston arrangement including primary piston 14 and secondary piston 16. The primary piston 14 is arranged in a subassembly that includes a spring retainer 38 which is slidably retained on piston extension 34 by means of fastener 35. A return spring 39 is carried between spring retainer 38 and spring retainer 57. Spring retainer 57 is carried on piston extension 34 and is maintained in position by fastener 35. The primary piston subassembly also includes a seal 36 carried in circumferential groove 40 of primary piston 14 and seal 43 carried on piston extension 34. Seals 36 and 43 of primary piston 14 define movable boundaries of compliant chamber 51 and primary high pressure chamber 50 in longitudinal bore 20 as detailed below. The primary piston 14 is operable to selectively pressurize a braking circuit (not illustrated), through the outlet opening Secondary piston 16 is substantially spoolshaped and is slidably carried in longitudinal bore 20 forward of primary piston 14. Secondary piston 16 is engaged by spring retainer 38 of the primary piston subassembly. A spring retainer 41 is carried on secondary piston 16 and a return spring 42 extends between the spring retainer 41 and the end 37 of the longitudinal bore 20 biasing the secondary piston 16 toward the primary piston 14.

Secondary piston 16 carries a primary seal 46 fluidly separating longitudinal bore 20 into secondary high pressure chamber 52 and secondary low pressure chamber 53. Secondary piston 16 also carries a secondary seal 47 that separates secondary low pressure chamber 53 from primary high pressure chamber 50 within the longitudinal bore 20. The secondary piston 16 is operable to selectively pressurize a braking circuit (not illustrated), through the outlet opening 45.

Master cylinder body 12 includes integrally formed bosses 17 and 18 which are adapted for connection to reservoir 11. A transverse bore 21 extends into boss 17 and a transverse bore 22 similarly extends into boss 18. A compensation port 23 provides an opening between transverse bore 21 and longitudinal bore 20 between the seal 43 and the seal 36. A bypass hole 24 provides an opening between transverse bore 21 and longitudinal bore 20 into primary high pressure chamber 50. Similarly, a compensation port 25 provides an opening between transverse bore 22 and longitudinal bore 20 into secondary low pressure chamber 53. Additionally, a bypass hole 26 provides an opening between transverse bore 22 and longitudinal bore 20 into secondary high pressure chamber 52. The compensation ports 23 and 25 and the bypass holes 24 and 26 provide fluid routes between the reservoir 11 and the bore 20 of master cylinder body 12.

Referring additionally to FIG. 2, the area around primary piston 14 is illustrated in greater detail. The primary piston 14 resembles a spool and includes an annular groove 40 formed around the circumference of the primary piston 14. Formation of the circumferential groove 40 results in shoulders 80 and 81 remaining as part of primary piston 14 near the wall 19 of longitudinal bore 20. A sufficient space exists between the shoulders 80 and 81 and the wall 19 of longitudinal bore 20 so that the primary piston 14 freely slides longitudinally. This also means that fluid is communicable between the shoulders 80, 81 and the wall 19 of longitudinal bore 20.

The primary piston 14 carries a seal 43 on piston extension 34. Seal 43 extends radially outwardly from the piston extension 34 and includes a forward turned lip 54 that engages wall 19. The lip 54 operates to maintain fluid pressure in primary high pressure chamber 50 when the primary piston is moved to a brake apply position such that lip 54 engages wall 19 to the left of bypass hole 24 as viewed in FIG. 2. The seal 43 also operates to permit fluid compensation flow into the primary high pressure chamber 50 when the primary piston moves back to the illustrated at rest position from the apply position between the wall 19 and the lip 54.

Primary piston 14 carries a second seal 36 in circumferential groove 40. The seal 36 includes a rearwardly turned lip 49 that engages the wall 19 of longitudinal bore 20. The seal 36 operates to prevent the flow of fluid between the compliant chamber 51 and the compensation port 23 past shoulder 81 and along the outer periphery of primary piston 14. The lip 49 is deflectable and operates to allow fluid flow between the lip 49 and the wall 19 to the compliant chamber 51.

The primary piston 14 includes an annular groove 55 that is open to the compliant chamber 51. A radial bore designated as flow restrictive orifice 33 is formed in the shoulder 80 of primary piston 14 from the outer periphery thereof to the annular groove 55. Therefore, a continuously open bypass is provided around seal 36 between the compensation port 23 and the compliant chamber 51 through the flow restrictive orifice 33 and the annular groove 55.

During operation of the associating braking system, the primary high pressure chamber 50 typically becomes closed off and isolated from the remainder of the braking system preventing the communication of fluid through outlet 44. Similarly, the communication of fluid through outlet 45 is prevented. This means that the primary piston 14 becomes substantially immovable due to the non-compressible fluid trapped in the chambers 50 and 52. To provide desirable feel and travel characteristics to the pedal 13, compliancy is provided in the system by means of the compliant assembly 58.

Compliant assembly 58 includes push rod piston 60 which is slidably carried in longitudinal bore 20 on the first side 74 of primary piston 14. The first side 74 of primary piston 14 faces the compliant chamber 51 while the second side 75 of primary piston 14 faces the primary high pressure chamber 50. The push rod piston 60 includes a seal 63 which seals the end of compliant chamber 51 and push rod piston 60 is retained in the longitudinal bore 20 by a retaining ring 64. The push rod piston 60 also includes a post 61 which extends towards the primary piston 14.

The push rod piston 60 is biased away from the primary piston 14 by an inner spring 70 which is seated in annular groove 55 of primary piston 14 and continuously engages both the primary piston 14 and push rod piston 60. An outer spring 72 encircles the inner spring 70 and extends substantially between the primary piston 14 and push rod piston 60. However, with the push rod piston 60 in the at-rest position shown, when the outer spring 72 engages the annular ledge 56 of primary piston 14 there exists a 2 mm clearance 78 between the fully extended outer spring 72 and the annular face 67 of push rod piston 60.

A greater load is required to deflect the outer spring 72 than the inner spring 70. Therefore, after the initial 2 mm of travel of pushrod piston 60 during a brake apply, the force required for further movement is increased significantly. This is because further movement in excess of 2 mm requires compression of both the inner spring 70 and the outer spring 72. The combination of springs 70 and 72 provides a close approximation of conventional brake application response at the pedal 13 while the primary piston 14 remains stationary. Since the spring length and stiffness directly effect the pedal travel versus pedal force characteristic the particular spring design is tailored for the particular application and therefore, the specific arrangement may vary within the scope of the present invention.

The compliant assembly 58 operates to provide a preselected response at the pedal 13 when actuated during a braking event that effects isolation of the master cylinder assembly 10 from the vehicle's wheel brakes (not illustrated). When force is applied to the pedal 13, push rod 16 is caused to apply force to push rod piston 60 such that movement of the push rod piston 60 occurs. Fluid is forced from the compliant chamber 51 through the annular groove 55. From annular groove 55, fluid is communicated to flow restrictive orifice 33, through compensation port 23, into transverse bore 21, and to the reservoir 11. The flow restrictive orifice 33 provides a continuously open flow route around the seal 36 and is specifically designed to permit compliancy of the system while providing a selected amount of resistance in the form of fluid force operating against movement of the push rod piston 60 toward the primary piston 14.

During approximately the initial 2 mm of movement of the push rod piston 60, the inner spring 70 provides a relatively light amount of additional force resisting movement of the push rod piston 60. After the initial 2 mm travel, if additional force is applied to the brake pedal 13, the annular face 67 of push rod piston 60 contacts the outer spring 72. The outer spring 72 then operates to bias push rod piston 60 away from primary piston 14 which applies a larger additional force resisting movement of the push rod piston 60.

When the manually applied force is removed from the brake pedal 13, the inner spring 70 and the outer spring 72, force the push rod piston 60 to return to the at-rest position illustrated. The spring return of the push rod piston 60 is not assisted by fluid force since the fluid source is the unpressurized reservoir 11. Under the operation of the inner spring 70 and the outer spring 72, fluid is drawn to return from the reservoir 11 to fill the compliant chamber 51. The returning fluid travels freely past the deflectable lip 49 of seal 36 and around the outer periphery of primary piston 14.

As a means of ensuring that the master cylinder assembly 10 is operable to apply braking pressure by movement of the primary and secondary pistons 14, 16 if a sufficient amount of force is applied to the brake pedal 13, the end 65 of post 61 is contactable with stop 62 of primary piston 14 after sufficient compression of springs 70, 72. This enables pressurization of the high pressure chambers 50 and 52 for the application of fluid pressure through the openings 44 and 45 to the associating braking system. Therefore, the compliant assembly 58 provides a default mode of operation of the braking system by means of a manual mechanism when required.

What is claimed is:

1. A master cylinder comprising:

a body having a longitudinal bore and having a transverse bore extending into the body;

a reservoir carried on the body and communicating with the transverse bore with a compensation port extending through the body between the transverse bore and the longitudinal bore;

a primary piston slidably carried in the longitudinal bore having a first side and a second side wherein a compliant chamber is defined in the longitudinal bore on the first side of the primary piston;

wherein a flow path is defined between the reservoir and the compliant chamber, the flow path including the transverse bore and the compensation port with a flow restrictive orifice defined in the flow path;

a seal providing a one way bypass around the flow restrictive orifice providing free flow from the reservoir to the compliant chamber and preventing flow from the compliant chamber to the reservoir;

a push rod piston slidably carried in the longitudinal bore on the first side of the piston wherein the compliant chamber is defined between the primary piston and the push rod piston, the push rod piston having a post extending into the compliant chamber toward the primary piston, the push rod piston being movable between an at-rest position and a plurality of apply positions while the primary piston remains substantially unmoved wherein the compliant chamber is contractible and expansible;

a spring extending between and engaging both the primary piston and the push rod piston biasing the primary piston and the push rod piston apart;

wherein the compensation port of the transverse bore communicates with the compliant chamber through the flow path so that when the push rod piston is moved from the at-rest position fluid in the compliant chamber is forced through the compensation port and the flow restrictive orifice to the reservoir.

2. A master cylinder according to claim 1 wherein the primary piston includes an annular groove the annular groove opening to the compliant chamber and receiving the spring and the primary piston includes a radial bore extending into the primary piston and intersecting the annular groove, wherein the radial bore serves as the flow restrictive orifice in the flow path.

3. A master cylinder according to claim 2 wherein the primary piston includes a circumferential groove wherein the seal is carried in the circumferential groove.

4. A master cylinder comprising:

a body having a longitudinal bore and having a primary and secondary transverse bores extending into the body;

a reservoir carried on the body and communicating with the primary and secondary transverse bores with a compensation port and a bypass hole extending through the body between each transverse bore in the longitudinal bore;

a primary piston slidably carried in the longitudinal bore having a first side and a second side;

a fastener connected to the second side of the primary piston;

a spring retainer slidably carried on the fastener;

a return spring compressibly extending between the spring retainer and the primary piston;

a secondary piston slidably carried in the longitudinal bore on the second side of the primary piston and engaging the spring retainer;

a push rod piston slidably carried in the longitudinal bore on the first side of the piston wherein a compliant chamber is defined between the primary piston and the push rod piston in the longitudinal bore, the push rod piston having a post extending toward the primary piston the push rod piston being movable between an at-rest position and a plurality of apply positions while the primary piston remains unmoved;

an inner spring extending between and continuously engaging both the primary piston and the push rod piston;

an outer spring encircling the inner spring and substantially extending between the primary piston and the push rod piston and having clearance so that the outer spring does not engage both the primary piston and the push rod piston when the push rod piston is in the at-rest position;

wherein the compensation port of the primary bore communicates with the compliant chamber so that when the push rod piston is moved from the at-rest position while the primary piston and the secondary piston remain unmoved, fluid in the compliant chamber between the primary piston and the push rod piston is forced to flow through the compensation port to the reservoir.

5. A master cylinder according to claim 4 wherein the primary piston includes an annular groove the annular groove opening to the compliant chamber and receiving the spring and the primary piston includes a radial bore extending into the primary piston and intersecting the annular groove, wherein the radial bore serves as a flow restrictive orifice restricting the flow of fluid from the compliant chamber to the reservoir.

6. A master cylinder according to claim 5 wherein the primary piston includes a circumferential groove wherein a seal is carried in the circumferential groove the seal providing a bypass around the flow restrictive orifice so that fluid freely flows from the reservoir to the compliant chamber past the seal when the push rod piston returns to the at rest position.

7. A master cylinder comprising:

a body having a longitudinal bore and having a primary and secondary transverse bores extending into the body;

a reservoir carried on the body and communicating with the primary and secondary transverse bores with a compensation port and a bypass hole extending through the body between each transverse bore in the longitudinal bore;

a primary piston slidably carried in the longitudinal bore having a first side and a second side;

a fastener connected to the second side of the primary piston;

a spring retainer slidably carried on the fastener;

a return spring compressibly extending between the spring retainer and the primary piston;

a secondary piston slidably carried in the longitudinal bore on the second side of the primary piston and engaging the spring retainer;

a push rod piston slidably carried in the longitudinal bore on the first side of the piston wherein a compliant chamber is defined between the primary piston and the push rod piston in the longitudinal bore, the push rod piston having a post extending toward the primary piston the push rod piston being movable between an at-rest position and a plurality of apply positions while the primary piston remains unmoved;

an inner spring extending between and continuously engaging both the primary piston and the push rod piston;

an outer spring encircling the inner spring and substantially extending between the primary piston and the push rod piston and having a clearance so that the outer spring does not engage both the primary piston and the push rod piston when the push rod piston is in the at-rest position;

the primary piston having an annular groove the annular groove opening to the compliant chamber and receiving the inner spring the primary piston including a radial bore extending into the primary piston and intersecting the annular groove, wherein the radial bore serves as a flow restrictive orifice restricting the flow of fluid from the compliant chamber to the reservoir wherein the compliant chamber communicates with the reservoir through the annular groove, the flow restrictive orifice and the compensation port so that when the push rod piston is moved from the at-rest position while the primary piston and the secondary piston remain unmoved, fluid in the compliant chamber between the primary piston and the push rod piston is forced to flow through the flow restrictive orifice to the reservoir wherein the flow restrictive orifice provides a selected amount of resistance in the form of a fluid force in the compliant chamber operating against movement of the push rod piston toward the primary piston.

* * * * *